Figure 1:
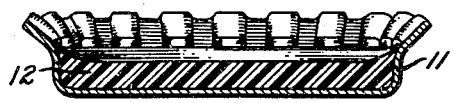

Sept. 23, 1947.  S. I. ARONOVSKY ET AL  2,427,699
CROWN CLOSURES
Filed Sept. 18, 1943

Inventors
S. I. ARONOVSKY
W. F. TALBURT
E. C. LATHROP

Patented Sept. 23, 1947

2,427,699

UNITED STATES PATENT OFFICE 2,427,699

CROWN CLOSURES

Samuel I. Aronovsky, Peoria, Ill., William F. Talburt, Berkeley, Calif., and Elbert C. Lathrop, Peoria, Ill., assignors to the United States of America, as represented by the Secretary of Agriculture Application September 18, 1943, Serial No. 503,002

1 Claim. (Cl. 215—40)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to crown closures, and has among its objects the elimination of waste and the reduction of time and labor in the production of crown closures by producing the composition of the seal directly in the crown cap of the closure.

Other objects of this invention will be apparent during the course of the following description.

In the copending application for patent of Lathrop and Aronovsky, Serial No. 499,508, filed August 21, 1943, a process is described for manufacturing a cork substitute composition with structure and properties similar to those of natural cork suitable for use as seals in crown closures. The present invention deals with methods of modifying this process in order to eliminate waste and reduce the time and labor involved in producing the completed crown closures.

According to the disclosure in the application mentioned above, compositions possessing mechanical properties similar to those of natural cork can be obtained by enclosing numerous particles containing gas or air cells, or vesicles, into an elastic material, thus forming a plastic composition containing numerous gas cells uniformly distributed therein and bound together by relatively thick elastic walls.

In general, the cork-like compositions described are obtained by first uniformly distributing the particles containing gas or air cells throughout a suitable fluid medium and thereafter converting the fluid medium to a resilient elastic solid.

The nature and composition of the fluid media may vary, depending upon the operating conditions and the properties desired in the final products. In general, the fluid medium comprises an elastomer, that is, a substance possessing some degree of residual resilience, dispersed in a suitable solvent or dispersing agent.

Preferably, an elastomer of a proteinous nature, such as gelatin, glue, casein, soybean proteins or soybean meal, egg albumin and the like, is used; the elastomer being dispersed in an aqueous dispersing media, including such liquids as water, aqueous ammonia, borax solution, sodium hydroxide solution, sodium carbonate solution, and certain organic nitrogen compounds, such as urea, various amines, and so forth, the selection of the dispersing agent being determined by the nature of the elastomer, as is well known to persons familiar with the chemistry of these materials. However, other organic elastomers, including Vinylite type resins, such as polyvinylchloride or acetate, may be used by converting them to a fluid state by means of suitable organic solvents. Solvents for this purpose are well known.

The properties of the final products may be controlled by additions of such substances as plasticizers and water-proofing agents which, in combination with the elastomers, modify their physical characteristics. For example, paraffin or other waxy materials, such as wax size, rosin size, high or low melting petroleum jellies, and so forth, may be used as water-proofing agents, and proteinous water-dispersible elastomers may be combined with permanent plasticizing agents, for example, glycerol (glycerine); glycols, such as diethylene glycol, ethylene glycol, butylene glycol, propylene glycol; sorbitol; mannitol; glucose syrups, such as corn syrup; malt extract; invert sugar; and similar lyophilic agents.

A suitable source of finely divided particles containing gas or air cells to be distributed throughout the fluid medium is comminuted cellulosic material of a pithy nature containing numerous air-filled interstices, such as paper pulp, wood pulp, and agricultural residue pulps including such materials as ground corncobs, ground peanut shells, cornstalk pith, bagasse pith, sorghum pith, or similar foraminous cellulosic substances.

The particles are added to the fluid medium and uniformly distributed therein by agitation, for example. A heterogeneous mixture is thus formed wherein the entrapped particles constitute the enclosed phase suspended in the fluid medium which constitutes the continuous phase of the mixture.

The number of air cells present in the mixture may be further increased by physical and by chemical means. Thus, foaming agents such as soaps, saponin, sodium hexametaphosphate, sulfonated fatty acids or alcohols, and so forth, may be added and the mixture subjected to vigorous agitation. Similar results can be obtained by addition of blowing agents which induce froth formation either by thermal decomposition like ammonium bicarbonate or by chemical reaction like bicarbonates used in combination with weak acids, such as, for example, stearic acid.

The cork-like compositions are obtained by converting the fluid medium of the mixture to an elastic solid by addition of suitable setting agents, such as formalin, paraformaldehyde, formaldehyde, formaldehyde and ammonia, hexamethylene tetramine, tannins, or chromium compounds, such as potassium dichromate, and then drying the solidified material.

The invention is practiced preferably according to the following general procedure.

A mixture comprising the elastomer, the dispersing agent, with or without a plasticizer and water-proofing agent, and the foraminous cellulosic material, is agitated, preferably with application of heat, until the elastomer is dispersed with an intimate mixture of the components has been effected. The homogeneous mixture thus obtained is subjected to high speed agitation and the foaming or froth-producing agent is added, if one is used. The mixture is then brought to the desired degree of intumescence by maintaining it under vigorous agitation for the necessary length of time. After adding the setting agent, the mixture may be extruded into desired forms, may be poured into a suitable container or mold and allowed to solidify, or it may be formed into sheets by the process and apparatus more fully set forth in the above-mentioned patent application. It is then dried under controlled humidity conditions.

As an illustrative embodiment of the manner of forming these compositions, the following example is given:

*Example 1*

| | Parts |
|---|---|
| 1. Gelatin (elastomer) | 40 |
| 2. Water (dispersing agent) | 200 |
| 3. Paraffin (water-proofing agent) | 2 |
| 4. Glycerine (plasticizer) | 30 |
| 5. Glucose syrup (plasticizer) | 30 |
| 6. Ground peanut shell (particles containing gas or air cells) | 40 |
| 7. Saponin (foaming agent) | 0.4 |
| 8. Formalin (setting agent) | 3 |

The gelatin is mixed with water and heated until the gelatin is melted, forming a gelatin and water solution. The temperature may be maintained at any desirable point above the melting point of the gelatin solution, but we prefer a temperature of 60° to 65° C., in which range decomposition of the gelatin does not take place readily. The other materials, with the exception of the formalin, are then added to the hot gelatin solution, or all the other components with the exception of the formalin may be mixed together in the cold and heated until a uniform mixture is obtained, which is then added to the hot gelatin solution, or a portion of the water, glycerine, and glucose syrup may be mixed with the gelatin and the remainder mixed with the peanut shell, and the two mixtures heated separately and then mixed together, or the cold peanut shell mixture may be poured into the hot gelatin mixture and stirred until smooth. The paraffin may be added at any time during the mixing and heating, and stirred into the mixture until it is melted and uniformly distributed into the latter, or it may be added in the molten condition to the mixture. The saponin may be added at any time during the above procedure or during the whipping stage to be described later.

After the mixture is all melted and uniform in appearance, it is placed in high speed mixing equipment. If the saponin had not been added previously, it is added at this point. Then the mixture is stirred at any desired speed above that necessary to keep the paraffin from coalescing into large particles as the temperature of the mixture decreases. As the temperature falls, preliminary gelation of the mixture commences to entrap air. The amount of air beaten into the mixture can be controlled by the speed of stirring and by the temperature of the mixture, greater speeds and lower temperatures resulting in a larger amount of occluded air.

When the mixture has reached the desired consistency, that is, when it contains sufficient air, the formalin is added and, after the latter is uniformly distributed throughout the mixture, the mass is poured into a mold, or plated out on a flat surface, or extruded, as desired. Chilling the mixture immediately after pouring may be desirable, as in extrusion, to set the mixture thermally and thus prevent the material from flowing prior to the setting-up or hardening action of the formalin, but this is not necessary as the same result may be obtained by regulation of the consistency of the mixture prior to pouring.

The poured mixture sets-up or hardens sufficiently in a few minutes to enable it to be removed from the mold, surface, or extrusion apparatus. At this stage it is soft, very flexible, and has a rubber-like elasticity. After drying in a humid atmosphere at any desired temperature up to about 105° C., the material hardens somewhat, the degree of hardening increasing with the time and temperature of drying. On removal from the drying chamber and exposure to the normal conditions of room temperature and humidity, the hardened material becomes soft and resilient, but not to the same extent as before drying, and tough. We prefer drying at 50° to 65° C. to prevent excessive loss of moisture and reduce the time of return to normal conditions, or of seasoning. The material is now ready to be cut, sliced, stamped, or punched into the desired shapes.

The finished material has a cellular structure with a large number of totally enclosed air spaces. These air spaces are fairly small and uniform and are separated from each other by relatively thick partitions of the elastic solid material. Thus, the physical structure of the finished material is similar to that of cork.

In the usual methods of manufacture of crown closures known to the art, the sealing material for crown closures is produced in the form of sheets or molded in the form of rods. The seals are then stamped from the sheets, or sliced from the rods and placed in the crowns with a suitable adhesive. About 30 to 35 percent of the sheet material is wasted in the stamping process, and it is practically impossible to reduce this amount of waste, due to the size of the required seal stampings. In the case of the rod material, the rods require a relatively long aging period before they are suitable for slicing.

We have found that a superior crown seal can be produced by forming the above-mentioned composition directly in the crown. The several ingredients of the composition are mixed essentially as described, but, instead of plating out the composition in the form of a sheet, definite small quantities of this composition are poured directly into the prepared crowns. The crowns are tapped or vibrated slightly to allow the viscous composition liquid to attain a uniform level within the crowns. The crowns containing the composition are then dried in any desired manner. They may be brought to any desired moisture content by exposure to atmospheres of appropriate relative humidities, or by controlling the original drying procedure in the various methods known to the art. The crowns may then be used with or without a suitable "spot" material, depending on the material to be sealed.

Figure 2:
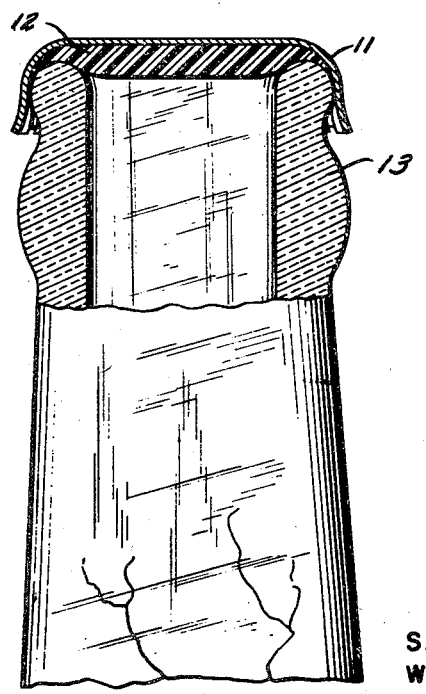

A crown closure according to our invention is illustrated in the accompanying drawing, in which Figure 1 is a sectional view of the crown closure; and Figure 2 is a corresponding view with the crown closure fitted on a bottle opening.

In the drawing, the numeral 11 represents a metallic cap and 12 the poured in composition, 13 being the neck of the bottle to which the crown closure is applied.

Any of the compositions described in the copending application may be used, including elastomers produced from various proteins, Vinylite type resins, and similar materials.

A novel feature of this invention is the fact that the hardening or setting agents need not necessarily be added to the composition before the latter is poured into the crowns. We have found, for example, in the case of glue or other protein elastomers, that equally good results are obtained by coating or spraying the surface of the composition poured into the crown with formaldehyde, formaldehyde-ammonia, trioxymethylene, or other protein setting or hardening agents. The coating of hardening or setting agent may be placed on the surface of the composition in any of the methods well known to the art, but we prefer to spray it onto the composition surface to obtain more uniform coverage. Spraying is also a method of application which allows very close control of the amount of setting or hardening agent applied. The rate of hardening or setting of the composition may be increased by coating or spraying the inner surface of the crown with the setting agent before the composition is poured into the crown and followed, if desired, by additional spraying of the composition surface with the setting agent.

The composition may be dispensed into the crowns by any suitable means known to the art. Based upon the density and thickness desired, the correct amount of composition may be measured into the crown by either volumetric or gravimetric means. The density and thickness of the composition layer in the crown may be varied to suit the required conditions for use. We prefer to dispense 2 grams per crown, for example, to form a liner with an air-dry density of about 0.650 relative to water and a thickness of 0.080 inch to 0.095 inch, for sealing carbonated beverages, but thicker and thinner layers of our compositions of various densities have been used successfully.

Immediately after the composition is placed in the crown, the latter is preferably tapped gently or vibrated in order for the viscous fluid to assume a uniform level horizontal surface. The surface may then be sprayed or coated with the setting or hardening agent. The composition in the crown is then dried, by placing in a drying oven or tunnel where it is met by a current of warm air, by traveling over a stove or hot plate, by means of infra-red waves, or by any other suitable drying means known to the art. The surface of the dried composition is partly or fully covered with a "spot" of suitable material and dimensions, and the completed seals are then stored at atmospheres of 40 to 60 percent relative humidities prior to use in bottling.

Another novel feature of this invention is the elimination of the necessity for an adhesive between the composition surface and the "spot" material. If the lower or contact surface of the "spot" material is wetted or moistened and then placed in the center of the wet surface of the composition in the crown immediately after tapping or vibrating, or immediately after spraying with the setting or hardening agent if this method of hardening the composition is used, an excellent bond between the "spot" material and composition will be formed. After drying the "spotted" composition prepared in this manner, it was found that the "spot" material could not be peeled from the composition. The bond was stronger than either the composition material or "spot" material, as evidenced by the fact that on attempting to remove the "spot," either the "spot" material tore or else part of the composition material was also removed with it.

Other closures besides crown seals are prepared in a similar manner. For closures where contact between the closure body and the contents of the container is not objectionable, the seal may be formed as an annulus in the inner periphery of the closure. The empty closure is rotated and the composition is poured in a small stream at the inner periphery of the closure. The composition tends to flow up on the closure wall, the amount of rise increasing with the speed of rotation. Thus a uniform circular sealing ring is formed in the inner periphery of the closure. The setting or hardening agent may be added to the composition prior to pouring into the closure or it may be coated or sprayed upon the formed ring. The drying and storaging is carried out as with the crown seal closures.

The manufacture of the closure described above can best be accomplished, in the interest of economy, by automatic dispensing machinery known to the art.

*Example 2*

A composition was prepared according to the procedure given in the copending application, one example of which is:

| | Parts |
|---|---|
| 1. Glue or gelatin | 40 |
| 2. Glycerine | 30 |
| 3. Glucose syrup | 30 |
| 4. Ground peanut shell | 40 |
| 5. Wetting agent | 1.5 |
| 6. Water | 200 |
| 7. Trioxymethylene | 2 |

All of the ingredients, with the exception of number 7, were mixed together, heated to 60° C., and then whipped with a high speed stirrer until sufficient air had been incorporated to give a density of about 0.75, relative to water. The temperature of the mixture at this point was about 45° C. Then the trioxymethylene was stirred into this mixture and 2.0±0.2 gram samples were pipetted into the crowns. The latter were tapped on the table top immediately to "level" the fluid composition, and allowed to stand for a few minutes before placing them in an air oven to dry. After drying the centers of the composition surfaces were covered with a paper "spot" material and then allowed to season at 70° F. and 50 percent relative humidity.

Commercial bottling tests made with these crowns in several beverage plants showed that the crown seals prepared in this manner are fully as good as those containing composition cork or our cork substitute composition prepared in sheet form.

*Example 3*

Same composition as in Example 2, except that no setting or hardening agent was added to the composition prior to its introduction into the crowns. Immediately after tapping, the surface of the composition was sprayed with a small amount of 40 percent formaldehyde solution. The drying, "spotting," and seasoning were carried out essentially as in Example 2.

The application of these crown seals in commercial bottling yielded results similar to those obtained in Example 2.

Example 4

Similar to Example 3, except that the inner surface of the crown was sprayed with a 40 percent formaldehyde solution prior to introduction of the composition. About the same amount of formaldehyde was used as in Example 3, but none was sprayed on the surface of the composition. The treatment of the crown seals and the results from bottling were similar to those obtained in Example 2.

Example 5

Similar to Example 3, except that about half of the required formaldehyde solution was sprayed into the empty crown and the remainder onto the surface of the composition immediately after tapping. This treatment apparently caused somewhat more rapid setting-up of the composition than was the case in Examples 3 and 4. Otherwise, the results obtained in bottling were similar to those of the previous examples.

Example 6

Similar to Examples 2 to 5, except that the "spot" is placed upon the surface of the composition immediately after tapping, or if the surface is sprayed with the setting agent, immediately after spraying. For this purpose the "spot" material, whose uncoated side is made of paper or other material with a capillary structure or with a water-wettable surface, does not need an adhesive to bind the "spot" to the composition surface as the bond between the composition surface and the under side of the "spot" material, as described above, is very strong after drying. This eliminates one of the difficulties generally encountered with crown seals, namely, loosening and loss of the "spot" during the process of bottling in automatic machines. The crown seals, "spotted" as described above, gave essentially the same results in commercial bottling as were obtained under Examples 2 to 5.

Example 7

A 63-millimeter screw type closure was placed open end up on a small turntable, and rotated at a speed of about 30 R. P. M. Then a definite amount of the composition containing all of the ingredients, essentially as described in Example 2, was poured slowly into the inner periphery of the closure. The rotational speed of the latter was such that the composition did not flow toward the center of the closure and, at the same time, rose but slightly along the inner wall of the closure. The drying and seasoning of this seal is carried out in essentially the same way as those used for crown seals. The addition of the setting or hardening agent may be carried out essentially as described in Examples 2 to 5.

"Spot" material may or may not be used with these 63-millimeter closures, as desired. It is possible to use a complete "spot," covering the opening of the container, as in the case of crown seals, or the "spot" may cover just that portion of the composition exposed to the contents of the container, overlapping a little so that the upper edge of the container neck is in contact with the "spot" material on its inner portion and with the uncovered composition surface on its outer portion. It is recommended that some type of "spot," consisting of waterproof material, be used for sealing jars containing aqueous liquids or materials. For non-aqueous liquids and for oils, waxes, aqueous and non-aqueous creams and for solid material it is not necessary to cover the surface of the cork substitute composition in contact with the container contents.

The use of our invention in the manufacture of sealing closures, particularly crown seals, eliminates a number of steps from the methods previously used to make cork composition seals and, thus, will result in a considerable saving in time and in money in the production of these seals. The extrusion and baking equipment and the long curing period necessary for the ordinary binder-cork composition are eliminated, as our composition requires only the simple mixing and stirring apparatus described in the copending application referred to above. In the case of manufacturing the seals by stamping them out from a sheet, the 35 percent of waste unavoidably encountered is entirely eliminated in our present invention wherein no waste material is produced.

It must not be construed that our invention is limited in scope by the preceding examples. The latter are given merely as an illustration of the possibilities of this invention. All of the compositions covered in the copending application referred to above can be used equally well in this invention, depending upon the properties desired in the final product.

Having thus described the invention, what is claimed is:

A closure comprising a cap having molded and hardened therein a seal composed essentially of a proteinaceous material containing a permanent plasticizing agent and a uniform distribution of minute gas cells and a pithy cellulosic material in the form of comminuted particles, said particles containing groups of microscopic gas cells.

SAMUEL I. ARONOVSKY.
WILLIAM F. TALBURT.
ELBERT C. LATHROP.

REFERENCES CITED

The following references are of record in the file of this patent:

UNITED STATES PATENTS

| Number | Name | Date |
|---|---|---|
| 615,725 | Lindemeyer | Dec. 13, 1898 |
| 691,382 | Hughes | Jan. 21, 1902 |
| 691,383 | Hughes | Jan. 21, 1902 |
| 993,288 | Bartlett | May 23, 1911 |
| 1,110,138 | Jones | Sept. 8, 1914 |
| 1,373,060 | Eberhart | Mar. 29, 1921 |
| 1,706,209 | Busch | Mar. 19, 1929 |
| 1,717,664 | Clark | June 18, 1929 |
| 1,861,589 | Warth | June 7, 1932 |
| 1,956,012 | Egan | Apr. 24, 1934 |
| 2,227,809 | Greenup | Jan. 7, 1941 |
| 2,238,681 | Dorough | Apr. 15, 1941 |
| 2,285,370 | Staelin | June 2, 1942 |
| 2,341,925 | Kulman | Feb. 15, 1944 |
| 2,383,096 | Warth et al. | Aug. 21, 1945 |
| 2,389,761 | Burgeni | Nov. 27, 1945 |
| 2,392,238 | Fankhanel | Jan. 1, 1946 |

FOREIGN PATENTS

| Number | Country | Date |
|---|---|---|
| 340,758 | Great Britain | Jan. 8, 1931 |
| 14,988 | Great Britain | 1908 |
| 11,171 | Great Britain | 1909 |